Nov. 1, 1955  G. W. SCHMIEGE ET AL  2,722,578
VEHICLE MOTOR STARTER SWITCH
Filed Feb. 25, 1953

INVENTORS
Herbert F. Schmiege
BY George W. Schmiege

Winston E. Miller
ATTORNEY

United States Patent Office 2,722,578
Patented Nov. 1, 1955

2,722,578

VEHICLE MOTOR STARTER SWITCH

George W. Schmiege and Herbert F. Schmiege, Saginaw, Mich.

Application February 25, 1953, Serial No. 339,003

1 Claim. (Cl. 200—61.88)

The present invention relates to new and useful improvements in starter switches for motor vehicles and is particularly related to a starter switch that is located on the conventional gear shift lever.

Inasmuch as practically all manufacturers of automobiles are now utilizing the steering column control shift lever which requires a shifting lever below the steering wheel, my invention is of value in obviating the need for pressing a starter button on the vehicle dashboard.

Objects of the invention are to provide a starter switch for motor vehicles which will be comparatively simple in construction, strong, durable, compact, highly efficient and reliable in operation, and which may be manufactured and installed at low cost.

All of the foregoing, and still further objects and advantages of the invention will become apparent to persons skilled in the art from a study of the following specification, taken in connection with the accompanying drawings, wherein like characters of reference designate corresponding parts throughout the several views, and wherein.

Figure 1:
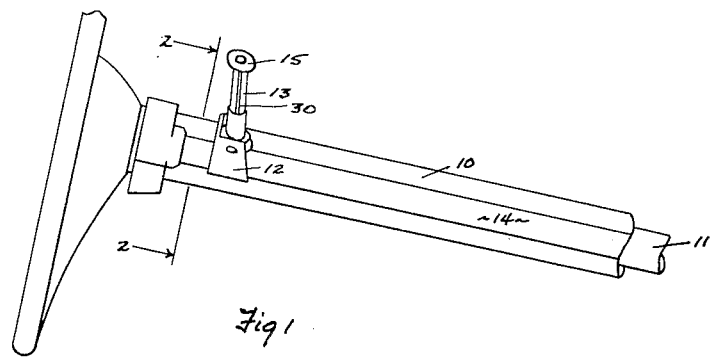
Figure 1 is an elevational view of a steering post and gear shift lever and indicates the starter switch housing on the handle of the shift lever.
Figure 2:
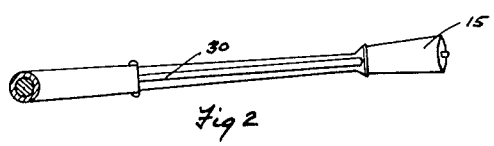
Figure 2 is a sectional view taken substantially on line 2—2 of Figure 1.
Figure 3:
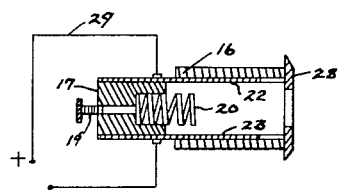
Figure 3 is a sectional view of the switch mechanism.
Figure 4:
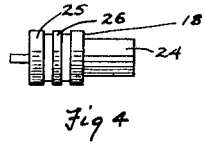
Figure 4 is an elevational view of the push-button and collar adapted for use with the switch mechanism indicated in Figure 3.
Figure 6:
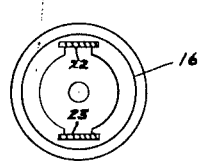
Figure 6 is an end view taken on line 6—6 of Figure 5.
Figure 5:
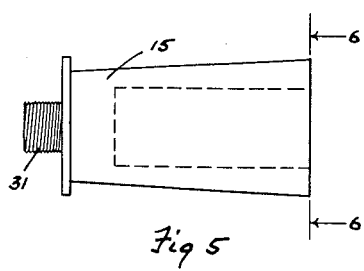
Figure 5 is an enlarged view of the handle.

Referring now in detail to the drawings, I have disclosed in Figure 1 the steering column post 10 within which is mounted the steering column shaft 11 for controlling the steering of the vehicle. Mounted by means of a suitable bracket 12 adjacent the upper end of the steering column is a shift lever 13 which is attached to the shift control rod 14.

Suitable seating means is provided in the handle 15 of the shift lever for supporting the socket member 16. At the closed end 17 of said socket member is a bolt 19 for locking said socket member in the handle. Inside said socket member and on opposite walls thereof are metallic slides 22 and 23.

The push-button 24 is attached to the collar 25 and a metallic band 26 is positioned about said collar. When the push-button and collar are inserted in the socket member, the resilient spring 20 is compressed and provides tension on said push-button.

Upon compressing the push-button into the socket member, the metallic band 26 closes the electrical circuit between the metallic slides 22 and 23. From this closed switch current is carried through the circuit in any desired manner to the starting motor. A cap 28 is adapted to fit over the end 18 of the collar and also holds the socket member inside the handle 15. The wires 29 extend from the socket member through the tube 30 and are directly connected to the vehicle electrical system in a conventional manner. The handle 15 can be readily attached to the standard gear shift lever by means of the threaded extension 31.

Inasmuch as simple adjustment can be made to the electrical system of a vehicle so as to preclude any possibility of starting the vehicle engine except when the shifting lever is in a neutral position, inadvertent starting of the vehicle is rendered impossible.

I am aware that changes may be made in certain details of the present construction without in any way departing from the underlying principles thereof and I therefore do not intend to be limited except as defined by the scope of the appended claim.

I claim:

In a vehicle motor starting switch, the combination comprising, a shifting lever handle, a socket member within said shifting lever handle, a push-button and collar within said socket member, a cap enclosing one end of said shifting lever handle, metallic inserts within said socket member, a metallic band disposed about said collar, a spring situated in said socket member and engaging said collar, means for closing an electrical circuit by compressing said push-button and collar within said socket member and thereby connecting said metallic band and said metallic inserts.

References Cited in the file of this patent

UNITED STATES PATENTS

| 1,895,337 | Nester | Jan. 24, 1933 |
| 1,985,808 | Suiter | Dec. 25, 1934 |
| 2,584,478 | Lindenmuth | Feb. 5, 1952 |